United States Patent [19]

Kehl et al.

[11] 4,047,328
[45] Sept. 13, 1977

[54] GREENHOUSE

[75] Inventors: Donald K. Kehl; Eugene A. Crist, both of Panama City, Fla.

[73] Assignee: Hygroponics, Inc., Panama City, Fla.

[21] Appl. No.: 657,761

[22] Filed: Feb. 13, 1976

Related U.S. Application Data

[62] Division of Ser. No. 492,014, July 26, 1974, Pat. No. 3,949,522.

[51] Int. Cl.² .............................................. A01G 31/00
[52] U.S. Cl. ........................................... 47/59; 47/17; 261/106; 98/30
[58] Field of Search .................................. 261/106–7; 98/40 C, 33 R, 33 A, 30; 47/17, 1.2; 165/121

[56] References Cited

U.S. PATENT DOCUMENTS

| 2,198,150 | 4/1940 | Barnhart | 47/1.2 |
|---|---|---|---|
| 2,983,076 | 5/1961 | Merrill | 47/1.2 |
| 3,063,104 | 11/1962 | Troxel | 47/17 X |
| 3,211,380 | 10/1965 | Skerritt | 261/106 X |
| 3,446,272 | 5/1969 | Gaines | 47/17 X |
| 3,515,378 | 6/1970 | Hill | 261/106 |
| 3,660,933 | 5/1972 | Wong | 47/1.2 |
| 3,747,501 | 7/1973 | Honda et al. | 47/17 X |
| 3,807,088 | 4/1974 | Jones | 47/1.2 |
| 3,812,616 | 5/1974 | Koziol | 47/17 |
| 3,949,522 | 4/1976 | Kehl et al. | 47/17 |

OTHER PUBLICATIONS

Greenhouse Climate Control—Acme Eng. & Mfg. Corp., Okla., 1969, pp. 11, 14, 28–29.
Cope, Ickes Braun Glasshouses, 1970, p. 6.
National Greenhouse Co. Catalog, No. 114, 1970–1971, pp. 16, 67, 69, 70, 81.

Primary Examiner—Robert E. Bagwill
Attorney, Agent, or Firm—Peter L. Berger

[57] ABSTRACT

A greenhouse is disclosed in which tubular curved members formed of standard unit lengths are used to form arched rafters while the same tubular members in uncurved form are used to form purlins. The tubular members are connected by suitable clamps to form a structural support for the roof of the greenhouse. A side leveling plate is provided on either side of the greenhouse to which the ends of the rafters are attached. The side leveling plate serves to anchor the rafters in the ground and also serves as a stapling surface for the covers placed over the roof of the structural support of the greenhouse. An environmental control system is provided in which the temperature, humidity and other environmental factors are controlled so as to provide enhanced growing climate for the tomato plants grown therein. Additionally, novel systems for correcting overwatering of the troughs as well as monitoring the water levels therein are provided.

17 Claims, 18 Drawing Figures

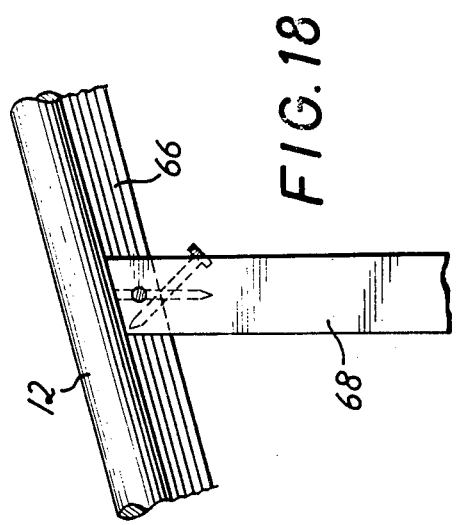
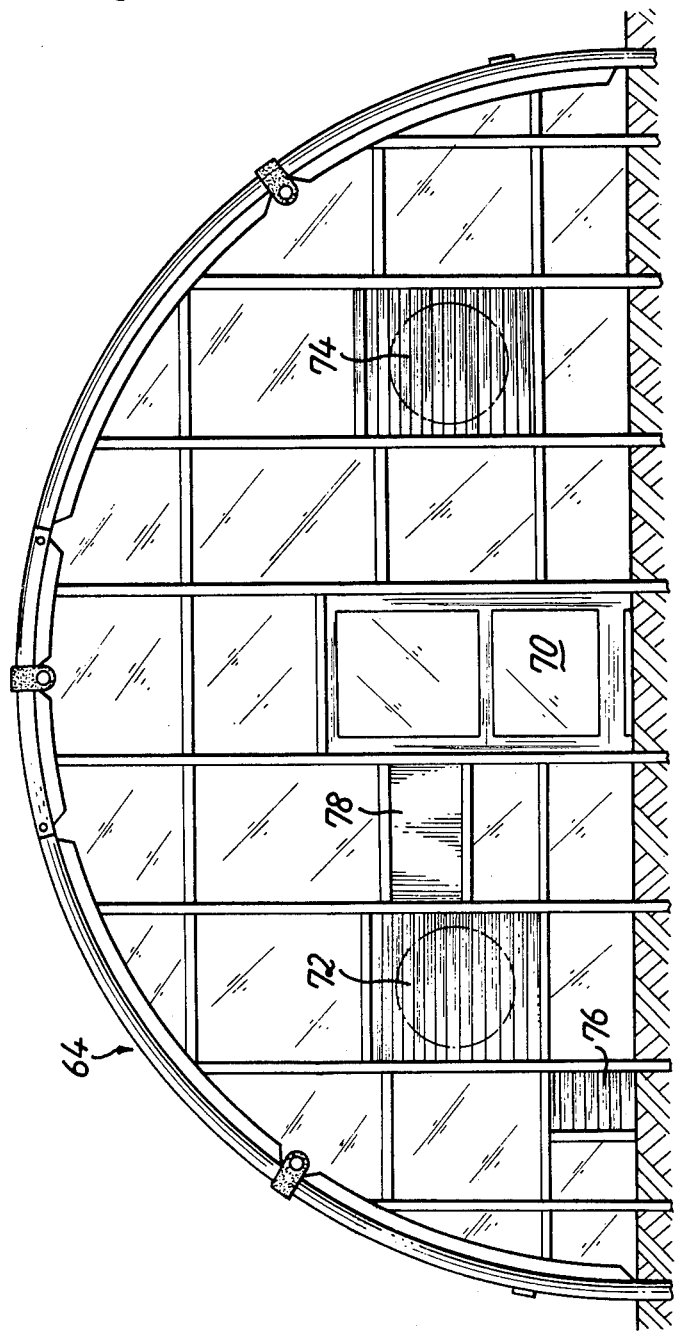

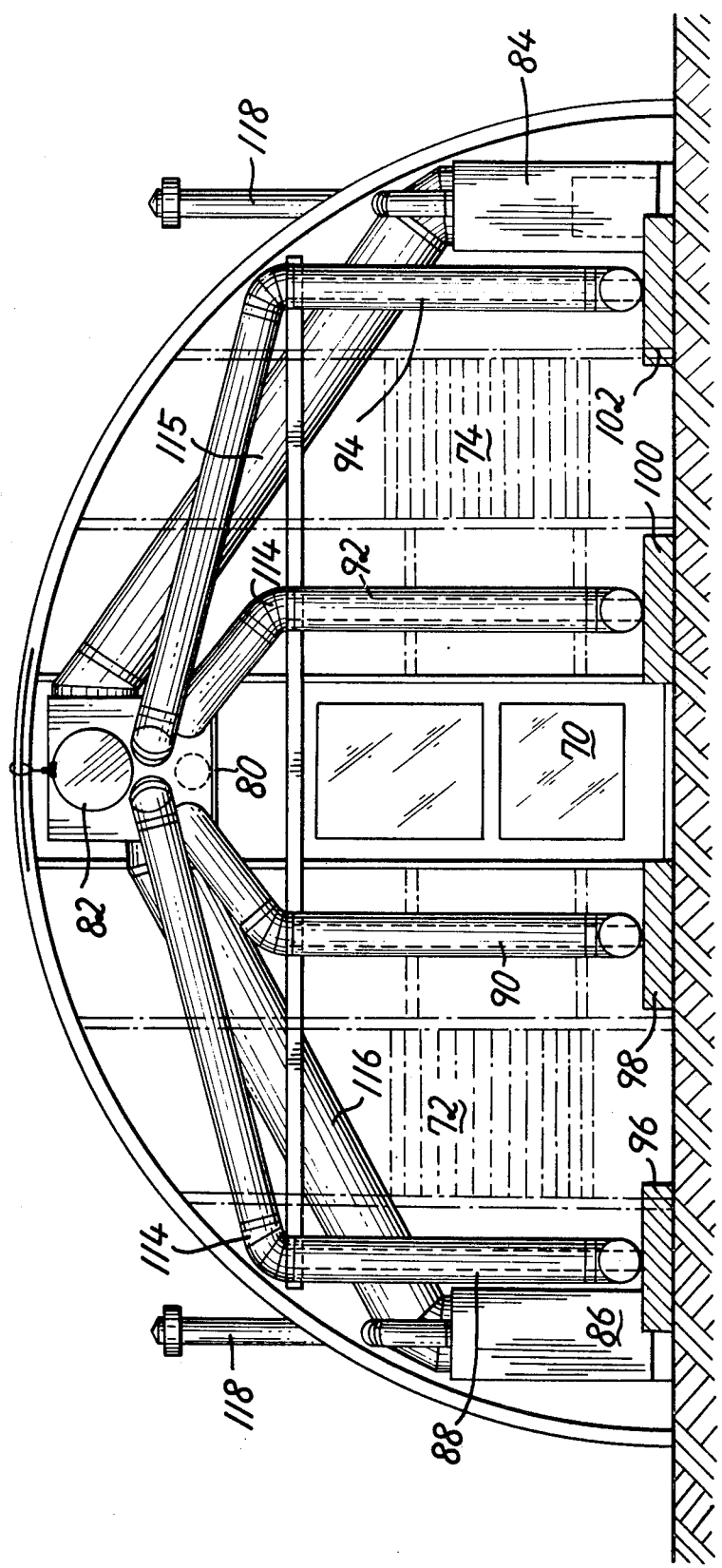

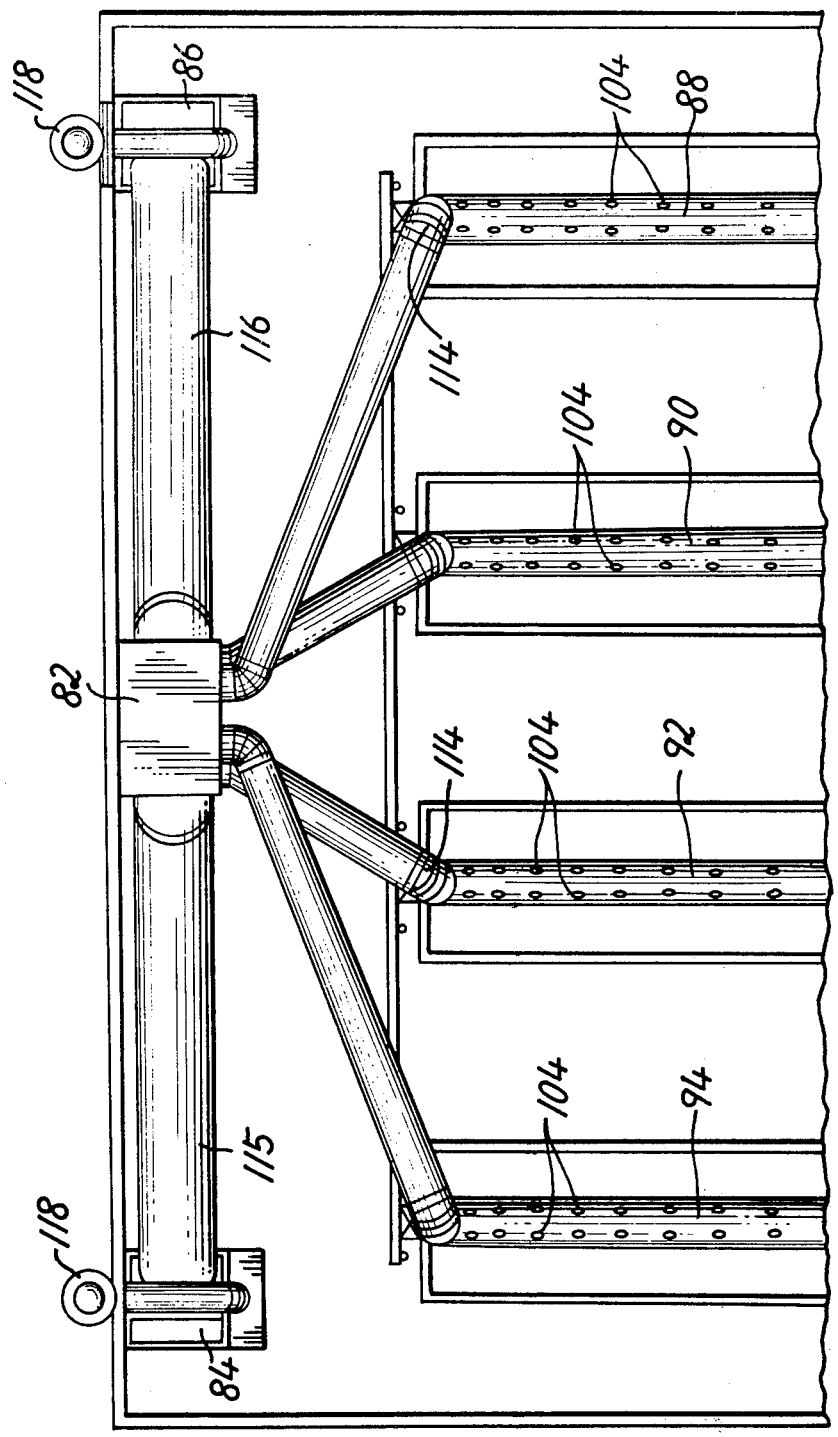

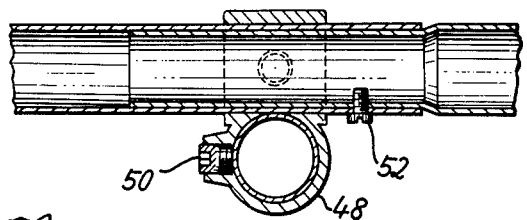
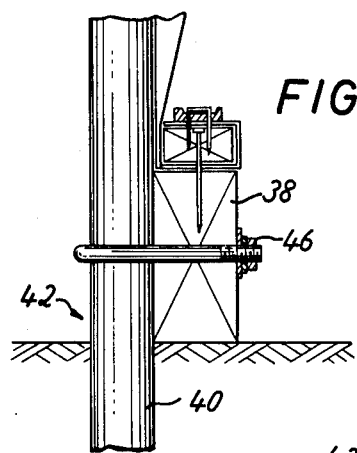
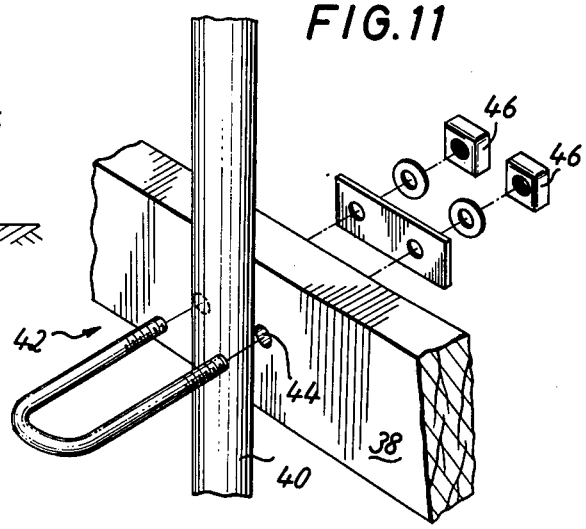
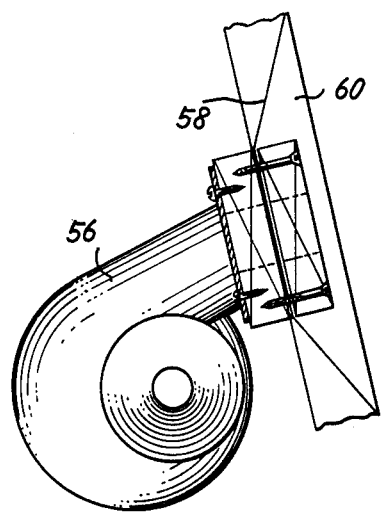

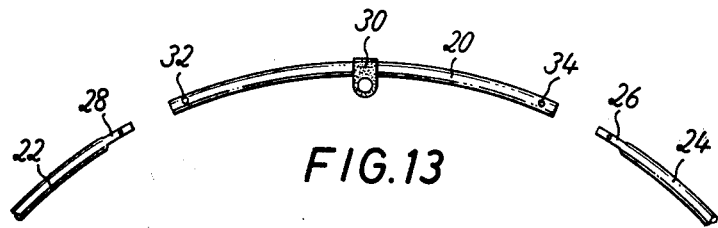
FIG.13
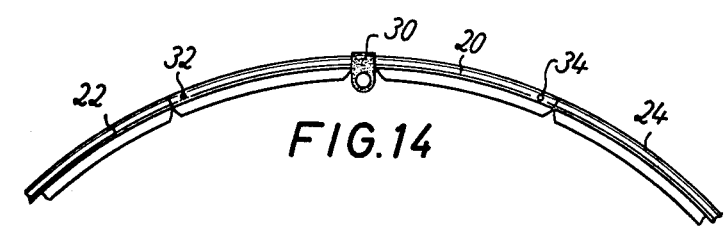
FIG.14
FIG.16
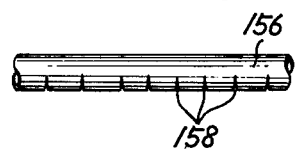
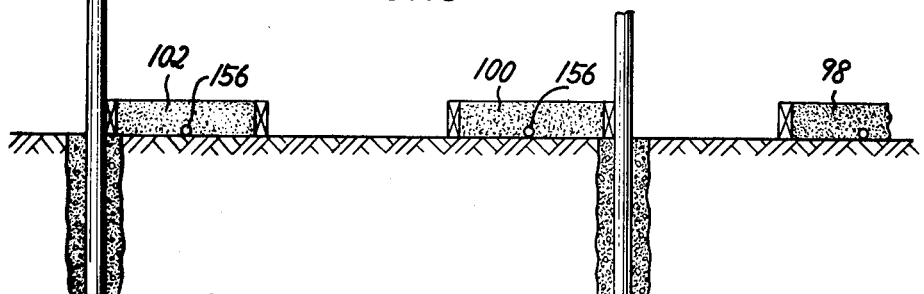
FIG.15
FIG.17
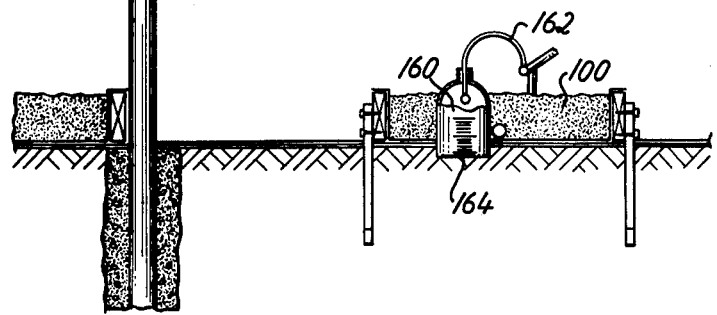

GREENHOUSE

This is a divisional patent application of Ser. No. 492,014 filed on July 26, 1974 entitled "Greenhouse" to U.S. Pat. No. 3,949,522.

BACKGROUND OF THE INVENTION

This invention relates to a greenhouse, and more particularly, to a greenhouse system in which trough planting is utilized.

Greenhouses which are sold for commercial growing purposes, generally have several disadvantages. For one, the greenhouses tend to be quite complex to assemble often requiring unique and unusual equipment. Additionally, these greenhouses tend to be expensive both in terms of their cost and their maintenance. In order for greenhouses to be commercially viable, their yield, both in terms of type of crop and amount must be sufficient. In order for tomato plants to be commercially grown, care must be exercised in controlling the environment in which the tomatoes are grown, so that a maximum number of plants per year can be grown in the greenhouse.

The structural support for conventional prior art greenhouses tends to require significant footing work if the greenhouse is to be properly anchored in the ground. Further, the materials utilized in constructing the structure supporting the roof of the greenhouse are generally of non-uniform sizes often requiring lots of different special parts to be located at special and unique places in the structure of the greenhouse. This can lead to errors in the construction of the greenhouse, since such greenhouses are often constructed by the purchaser, on site. Additionally, constructing such greenhouses out of non-standard parts requires inordinate inventories for the greenhouse supplier.

Environmental control systems to enhance the quality of the crop grown as well as its quantity are complex, expensive and often inefficient. In order for tomatoes to be grown, proper humidity, temperature and amount of sun light all correlated with each other are needed. Heating systems previously employed are generally inefficient for proper heating of the crops being grown while cooling systems also suffer from marked disadvantages. Additionally, it is necessary to periodically cleanse the greenhouse of fungus, insects and the like and prior art systems generally require an inordinate amount of time to accomplish the function in addition to a large expenditure of work effort.

Periodically it is necessary to cleanse the troughs due to a buildup of salts and the like, in order to enhance the trough growing system. Further, it is desirable to monitor the nutrients and water being supplied to the troughs, and the prior art generally does not provide sufficient, simple and desirable means for accomplishing the same.

An object of this invention is to provide an improved greenhouse eliminating the above said disadvantages as well as others not specifically enumerated.

Another object of this invention is to provide an improved greenhouse system having improved structural support characteristics.

Yet another object of this invention is to provide a greenhouse which may be simply and easily assembled and erected by ordinary laymen.

An object of this invention is to provide a greenhouse formed of structural components having unit size.

Another object of this invention is to provide such a greenhouse which may be conveniently anchored into the ground without the use of unnecessary footings.

Yet another object of this invention is to provide an improved environmental control system for controlling the environment within a greenhouse.

Another object of this invention is to provide such an environmental control system which efficiently heats the crop within the greenhouse.

Yet another object of this invention is to provide an improved cooling system for maintaining desirable temperature levels within the greenhouse.

Another object of this invention is to provide an improved system for controlling the humidity, temperature and amount of sunlight in order to enhance the growing characteristics of the crops within the greenhouse.

Still another object of this invention is to provide an environmental control system in which disease and pest control is easily accomplished.

Another object of this invention is to provide such a greenhouse including through culture in which excess salts within the troughs are easily flushed therefrom.

Still another object of this invention is to provide a monitor system for monitoring the amounts of water supplied to each of the troughs within the greenhouse.

Other objects, advantages and features of this invention will become more apparent from the following description.

SUMMARY OF THE INVENTION

In accordance with the principles of this invention, the above objects are accomplished by providing a unique greenhouse system in which there is provided a side rail placed on either side of the greenhouse upon leveled ground, the side rail serving to anchor the greenhouse in the ground as well as comprising an attachment or stapling surface for attaching the cover of the greenhouse thereto. The leveling plates are generally 2 × 4's, conventionally available, and enable easy and rapid assembly of the greenhouse. The rafters and purlins of the greenhouse are formed of tubular members, generally of standard lengths, preferably 21 feet, and the greenhouses constructed in accordance with this invention, can assume any of several standard widths, for instance 24 or 30 feet and any length up to 100 feet. Different sizes can be accommodated in accordance with the principles of this invention as desired.

The front wall of the greenhouse is formed o precut sections also formed of tubular members having attached thereto redwood precut for ease of assembly. In this manner the front wall can be easily assembled by connecting the corresponding precut redwood sections to form the front wall.

In order to enable the greenhouse supplier to utilize standard lengths for the tubular members, one of the ends of the tubular members is swaged and forms a male member for cooperation with a female receiving member in the adjoining tubular member. Thus, when the members are connected end to end, and they are bent in accordance with a desired curvature, an arch shape form is established, with the outer ends of the adjoining tubular members being fastened and secured by suitable U-bolts to the leveling plates. In one form of the invention, a bridge member is supplied for receiving the swaged ends of two tubular members, with the non-swaged ends being anchored to the ground and to the side leveling plates.

As a feature of this invention, an improved environmental control system is provided in which a distribution box is located above the door of the front wall of the greenhouse. The distribution box is connected to a pair of heater/blower housings located at ground level, these housings adapted to bring fresh air into the greenhouse or to recirculate air within the greenhouse, as desired. The distribution box is attached to a plurality of tubular duct means, each of the duct means carrying air from the distribution box directly to the troughs by placing the tubular ducts on the trough beds. Additionally, an overhead tubular duct means is provided in which air is forced into the greenhouse at an elevated level, as desired, to enhance the environmental control thereof. Provision of the heaters as the floor level, enhances the efficiency of the apparatus in that the hot air emanating therefrom naturally rises to the distribution box and more easily is distributed within the greenhouse.

As a further feature of this invention, a rear cooling assembly is provided in which adiabatic cooling is employed having horizontal pads located outside the rear wall of the greenhouse. A fine mist is provided above the upper pads, and air is drawn therethrough in order to achieve a desired cooling effect. A baffle system is provided so as to direct air entering the rear wall of the greenhouse upward towards the roof of the greenhouse and away from the tomato plants.

As still a further feature of this invention, the furnace/blower is located slightly above ground level and in order to provide adequate disease and insect control, a suitable chemical is placed thereunder and expands as a gas for easy distribution throughout the greenhouse by passing through the distribution box and tubular duct members.

The adiabatic cooling system of this invention is unique and provides an enhanced cooling system as specifically illustrated with the greenhouse. Use of a recirculating water system allows for ongoing cooling to take place without the requirements of large amounts of water being used in the process. This enables the cooling system to have direct commercial applicability with the present greenhouse, since the cost of maintaining and running the cooling system is relatively minimal.

As still further features of this invention, a self flushing system is provided in order to cleanse the troughs of salt buildups. Additionally, a monitoring system is provided to monitor the water being fed into the troughs so as to maintain the same within desired levels.

There is provided an integrally related humidity-temperature control in order to ensure that the growing conditions within the greenhouse are maintained within the desired humidity and temperature levels at all times, independent of the outside environmental conditions. In order for this to be accomplished, there is provided an interlock relay for preventing the operation of the blower means at the same time as the heater means is operating in order to ensure the proper humidity and temperature controls are maintained.

BRIEF DESCRIPTION OF THE DRAWING

FIG. 2 is a perspective view of the front of the greenhouse, FIG. 3 is a front elevational view of the greenhouse illustrating the tubular duct means connected to the distribution box for the environmental control system of this invention, FIG. 4 is a partial top view of the tubular duct system illustrated in FIG. 3, FIG. 9 is a perspective view of a blower used for maintaining a positive pressure on the cover of the greenhouse, FIG. 10 is a sectional view illustrating the connection of the side leveling plate connected to the rafter forming the structural support of the greenhouse, FIG. 11 is an exploded view of FIG. 10 illustrating the U-bolt connecting the rafter to the leveling plate, FIG. 12 is a sectional view illustrating a connecting member connecting two tubular support members, such as a purlin and a rafter forming the structural support of the greenhouse, FIG. 13 is a view illustrating the formation of a rafter in which a bridge is used to connect two unit lengths of tubular members, in exploded view, FIG. 14 is similar to FIG. 13 but illustrates the members being connected together, FIG. 15 is a sectional view taken through the greenhouse illustrating the overwatering and flush removal system, FIG. 16 is a sectional view through a trough illustrating the flush removal system of FIG. 15, and FIG. 17 is an end sectional view illustrating the system for monitoring the water levels within the troughs in the greenhouse, FIG. 18 is a detailed view illustrating the assembly of the front of the greenhouse.

DETAILED DESCRIPTION

The present invention is directed to a greenhouse structure and system for growing fruits, such as tomatoes in a trough culture. Trough culture is a system of growing fruits or tomatoes in a long, narrow, plastic lined bed containing an artificial light weight media. The trough is impermeable to roots.

Figure 1:
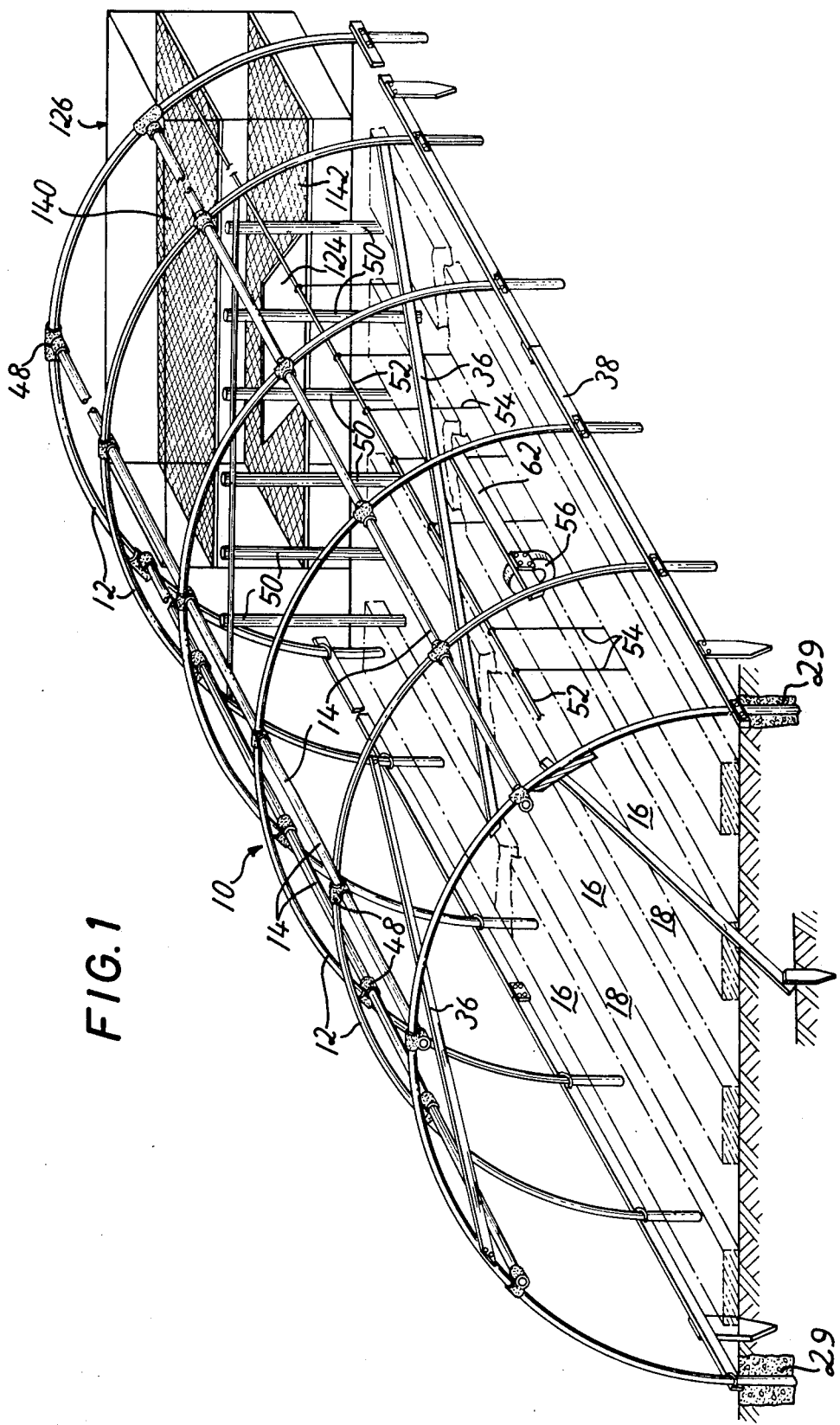
FIG. 1 is a perspective view of a greenhouse constructed in accordance with the principles of the present invention.

Referring to the drawings, and in particular to FIG. 1, ther is shown a perspective view of the support structure 10 for the greenhouse, the support structure being formed of tubular members 12 which form rafters, the tubular members 12 being bent to a curved shape and straight tubular members 14 forming purlins. There is also shown a plurality of of troughs 16 extending longitudinally within the greenhouse being supported on the floor 18 thereof. The troughs 16 are spaced sufficiently so as to provide walking space therebetween to enable the crops to be properly maintained.

Referring to FIGS. 13 and 14, there is shown a center bridge portion 20 connecting two tubular members 22 and 24 so as to form a rafter enabling the width of the greenhouse to be greater than merely connecting two of the tubular members 22 and 24 together. In particular, each of the tubular members 12, 14, 22, and 24 are formed of standard unit lengths, preferably 21 feet, with one end each of the tubular members being swaged as indicated at 26 and 28 of tubular members 24 and 22, respectively. The other ends each of the tubular members form female receptacle members for receiving the swaged ends of adjoining members. When the greenhouse is to be formed of such unit lengths of tubular members, one swaged end of one member is placed in the ground, while the female receiver end is connected to the swaged end of an adjoining member as shown in FIG. 1, with the unswaged end of the adjoining member being placed in the ground, accordingly. In particular, and with regard to FIG. 1, the ends of the rafters are sunk into the ground as indicated at 29 – 29, these ends being concrete reinforced as indicated therein. At regularly spaced intervals along the length of the greenhouse, the ends of the rafters are also sunk in holes properly provided, with or without concrete footings being utilized. Generally in view of the nature of the invention and the constructional features therein, it is unnecessary to provide concrete footings for the remainder of the rafter ends anchored in the ground.

Referring now to FIGS. 13 and 14, there is shown the bridge-member 20 connecting two standard unit lengths of tubular members, the bridge member having attached at its middle a connecting member 30 for enabling the purlin to be attached to the bridge member at the center for forming the center arch support of the greenhouse. Suitable screws are inserted in apertures 32 and 34 to enable the two tubular members 22 and 24 to be fixedly held to center bridge member 20. Thus, in constructing the rafters of the greenhouse, as in accordance with the present invention, these rafters may be formed of at least two standard unit lengths of tubular members, thus forming a 24 foot wide greenhouse or may be formed of the two unit lengths as well as the center bridge member 20 to form a 30 foot wide greenhouse.

There is further shown in FIG. 1 additional side supporting braces 36 for providing additional structural strength for the greenhouse structure.

Referring now to FIGS. 1, 10 and 11, there is shown, as a feature of the invention, a side leveling plate 38. When the greenhouse is to be constructed, the ground is levelled on either side thereof, and the levelling plate 38 is placed on the ground. Preferably, the levelling plate is a standard 2 × 4 formed of wood, but other suitable materials can be utilized, these materials serving both to provide anchoring support for the ends of the rafters supported in the ground as illustrated in FIG. 10, and as a stapling surface for the covering placed on top of the structural support of the greenhouse. In particular, the 2 × 4 side levelling plate extends a little longer than the full length of the greenhouse to provide suitable anchoring support for the rafters. With particular regard to FIGS. 10 and 11, there is shown an end 40 of the rafter being secured to side levelling plate 38 through a suitable U-bolt assembly 42. Suitable apertures 44 are provided in the side levelling plate for receiving the leg portions of the U-bolt, with nuts 46 adapted to be placed on the projecting ends of the legs so as to firmly secure the end 40 of the rafter to side levelling plate 38 in a manner illustrated in FIG. 10. Use of such a side levelling plate eliminates the anchoring problems often found with prior greenhouse structures, the side levelling plate of the present invention facilitating easy erection of the greenhouse by a layman. The elimination of the need for additional and significant concrete footings also facilitates the construction of the present greenhouse, and the use of the side levelling plate as a constructional feature to guide the erection of the greenhouse enables its easy erection.

Reference is now made to FIGS. 1 and 12, in which there is shown a Kee clamp 48 for securing transversally extending rafters and purlins as indicated throughout on FIG. 1. These clamps permit the transversally extending members to be securely connected by providing suitable apertures therein enabling the connecting members to pass therethrough yet be securely fastened by suitable Allen bolts 50 or standard screws 52 as illustrated in FIG. 12. These Kee clamps further enhance the easy erection construction of the greenhouse of this invention.

The present greenhouse is illustrated for use with tomato plants and these are generally supported by stout wires. There is provided a plurality of upstanding vertical supports 50 to which are connected vine support wires 52 formed of galvanized steel construction. The vine support post 50 is also of a steel construction. As the tomato plants grow, they are properly supported on vertically extending wires 54, one for each plant, so as to enable the tomato plants to properly grow.

The entire structure as illustrated in FIG. 1 is covered with a double cover of 6 mil copolymer, ultraviolet light inhibited material which reduces fuel costs and helps to eliminate drip from condensation. The double copolymer construction does not form a portion of this invention, but with further reference to FIGS. 1 and 9, there is shown a blower motor 56 used to mintain a positive pressure between the double cover, that double cover, being formed of sheets 58 and 60. The blower 56 causes such a positive pressure to be formed to provide a positive pressure between the double cover to provide the above enumerated advantages. The blower 56 is supported on a post 62 connected between two adjacent rafters as illustrated in FIG. 1.

It has thus been described the construction of the rafters, purlins, and ground support including the cover for the greenhouse. The present invention, by using the side levelling plate 38 eliminates the need for a foundation, that foundation generally being needed in prior art greenhouses. In particular, the present greenhouse is anchored into the ground, which simplifies its construction and assembly.

Referring to FIG. 2, there is shown a prospective view of the front wall assembly of the greenhouse. The front wall assembly 64 is also formed of an arched rafter member as with the other rafters of the present invention, the arched rafter having attached thereto a laminated interface 66 (see FIG. 18), that laminated interface 66 being formed of a plurality of wood strips precut for suitable assembly. The laminated strips 66 are attached to a standard tubular member such as 12 as illustrated in FIG. 18, and the pre-cut laminated interface 66 is adapted to fit for assembly purposes with suitable members of the front wall such as the studs 68 indicated in FIG. 18. Thus, the front wall is formed as illustrated in FIG. 2 of the laminated interfaces interconnecting with suitable studs and other interfaces so as to form the front 64.

Referring to FIGS. 2 and 3, there is shown the front door 70, exhaust fans 72 and 74, the exhaust fans being supported in the front assembly 64 of the greenhouse. Additionally, the front also has means for supporting a motorized shutter 76, that shutter being used within the environmental control system of the greenhouse, yet to be described. An electrical panel 78 is also mounted on the front of the greenhouse, that panel to be described in more detail hereinafter and suitable support 80 is provided on the inside of the front 64 of the greenhouse for a distribution box 82 to be described hereinafter with regard to the environmental control system. The electrical panel will include generally the power junction box, time clocks for humidity control and ventilation system, automatic watering system and equipment hook-up receptacles.

The environmental control system for the greenhouse in this invention will be described in more detail hereinafter.

One of the most effective means of controlling plant growth is regulating the greenhouse temperature. Respiration, or the process through which living plants constantly use food, varies considerably with temperature. Likewise, photosynthesis, which is the process of manufacturing food during the daylight hours is controlled by temperature.

The rate of photosynthesis is determined also by the amount of light available, so temperature must be coordinated with light conditions. On bright days when light does not limit photosynthesis, the greenhouse temperature may be higher than on dull days. When light is limited, a higher temperature may increase the respiration rate until the amount of food consumed by the plant is equal to or greater than that produced by photosynthesis. Night temperature must be low enough to insure that the food manufactured during the day is not entirely used up.

Night temperature should be held between 60° to 65°. Day temperatures of 70° to 80° is ideal on bright days. The temperature may range as high as 85° without adversely affecting the development of the crop. On cloudy days the temperature should be kept from 65° to 68°. When this temperature schedule is maintained, fruit buds should develop normally, and the fruits should be smooth and of high quality. In no case should the night temperature drop below 58° during fruit bud development, as this may cause poorly-formed blossoms that will abort, or misshapen tomatoes of poor quality.

The present greenhouse invention includes thermostatically controlled furnaces, which deliver air through a convection tube and provides uniform heat distribution and continuous air circulation. Through the use of blower fans on the heaters, the convection tube in inflated at all times during the heating season, which insures constant air movement within the house.

Summer Cooling: In the Southern areas of the U.S. there is probably no one factor that has a more direct bearing on the success or failure of a greenhouse operation than the proper design and function of the cooling system. It is extremely important that the grower not only recognize the problem and effects high temperatures play in growing quality fruit, but is prepared to take the steps necessary to correct this problem.

One problem is Photosynthesis, the process of manufacturing fruit, which is drastically reduced when temperatures rise above 85°. Other problems such as watering schedules, growth and misshapen fruit exist.

The greenhouse includes as a feature of this invention an adiabatic evaporative pad-fan type cooling system, which prevents excessively high greenhouse temperatures, maintains more uniform and positive ventilation throughout the greenhouse and obtains better temperature and humidity control to produce an improved growing climate. The cooling system not only cools the greenhouse to a desirable level, but also keeps plants on schedule, reduces watering requirements, provides cleaner air, achieves better insect control, eliminates stagnant air, and produces a better leaf surface microclimate for improved plant growth.

Humidity Control: During the spring, winter and fall seasons; when the outside and inside temperatures are about the same, it is difficult to keep the relative humidity in the greenhouse below the danger level of 90 percent, unless a humidity control system is used. High humidity encourages certain diseases; and if humidity is allowed to go over 90 percent for even one day, leaf mold infections may result.

The greatest amount of water vapor in a greenhouse comes from the plants themselves during the normal plant process of transpiration. As much as 500 pounds of water may be introduced into the atmosphere around the plants for every pound of dry matter produced within the plants.

Relative humidity is controlled by both ventilation and heating in accordance with this invention. If air containing a certain amount of moisture is heated, the relative humidity is reduced. For example, if the greenhouse temperature is 70° and the relative humidity is 90 percent; by raising the temperature 10°, the relative humidity is reduced to 65 percent.

Figure 5:
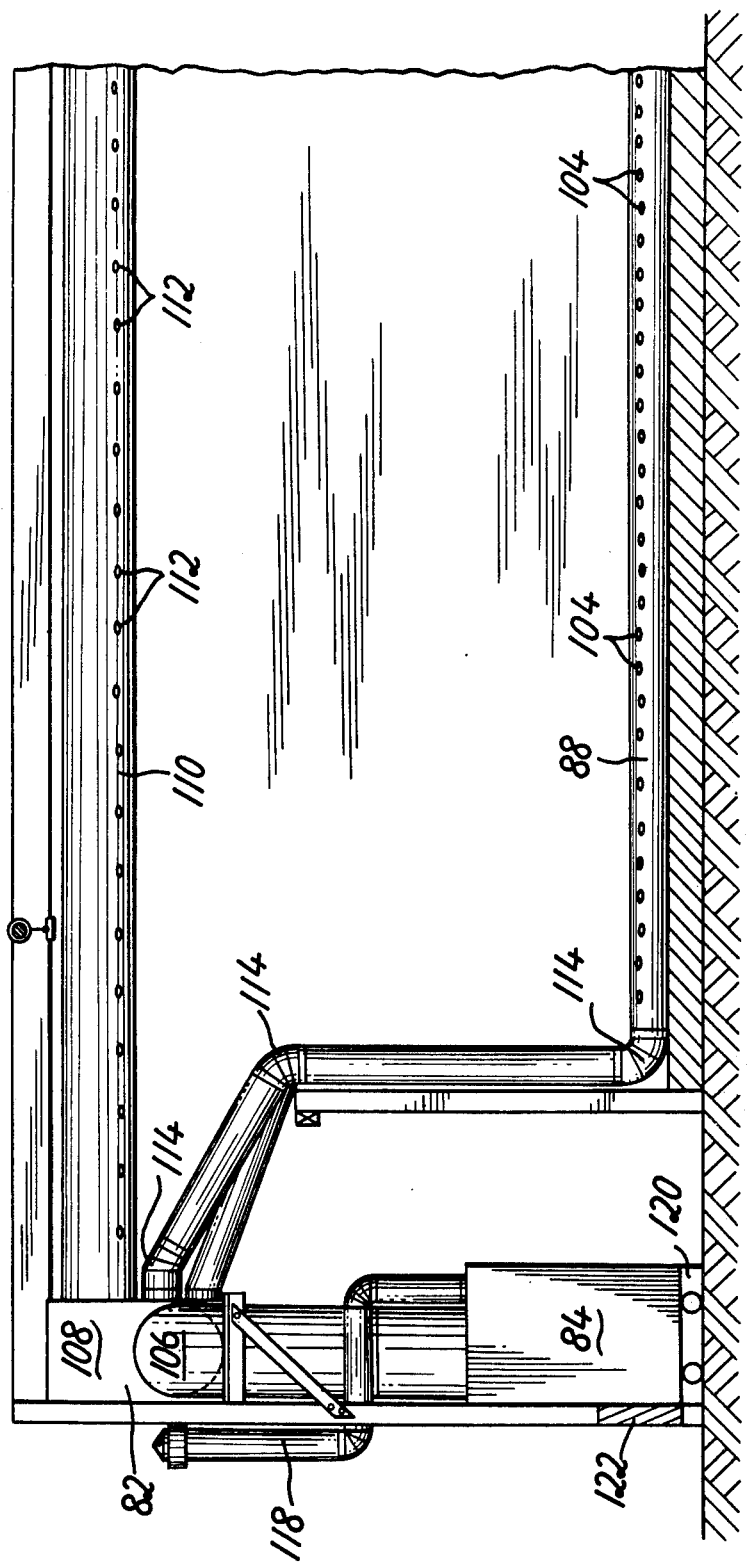
FIG. 5 is a side elevation view of the tubular duct system illustrated in FIGS. 3 and 4 above.

The above brief description related to the environmental conditions in which growing may be enhanced are effectively met with the present invention. Referring more particularly to FIGS. 2 through 5, there is shown a forced air system in which heaters 84 and 86 are employed. These heaters being used with blower systems contained within the same housings. Either the heater or blower may be operated independently of the other although, the heater is generally used in combination with the blower although the blower can be used without the heater. As described above, a forced air distribution system is utilized in which a distribution box 82 is employed, that distribution box being supported above the door of the greenhouse. A plurality of collapsible tubular duct means 88, 90, 92 and 94 are connected between the distribution box 82 and troughs 96, 98, 100 and 102, respectively. The ducts are formed of thin plastic tubes, these tubes being fully opened under pressure of the air carried therein. As illustrated more particularly in FIGS. 4 and 5, the ducts are connected to the respective troughs and are provided with pluralities of apertures 104 for allowing air to be distributed directly to the trough bases. The distribution box 82 is more clearly seen in FIG. 5 in which there is shown a two-chamber element, lower chamber 106 and upper chamber 108, each connected to different duct members of the environmental system. The upper chamber 108 is connected to a horizontally extending tubular duct member 110 suspended above the greenhouse plants and being provided with a plurality of apertures 112 as indicated for allowing forced air carried therethrough to be distributed throughout the greenhouse. As illustrated in the present invention, only one such horizontally extending elevated tubular duct means is illustrated, although others could be employed as desired. As further illustrated in FIG. 5, suitable elbow members 114 are provided for connecting the tubular duct means to the distribution box. The distribution box 82 is connected by tubular duct means 115 and 116 to respective heater/blower assemblies 84 and 86. Each heater/blower assembly is connected to a different one of the two chambers of the distribution box 82 for suitable distribution of the air carried and forced thereby to the greenhouse. In accordance with this invention, direct placement of the tubular duct means in the trough beds enables efficient heat distribution to be achieved, since the heat is directly applied to the area where the greatest impact can be effected for controlling growth. The upper elevated tubular duct means 110 is further used to supply additional heat as required during the cool season, as will be discussed hereinafter. Each furnace/blower is provided with a conventional flue as indicated in FIG. 5, and the heater/blower is supported slightly above the ground as indicated by numeral 120. A climate controlled shutter 122 is provided for use in conjunction with each of the heater/blower assemblies in order to enable fresh air to be brought into the greenhouse from the outside on a regular periodic basis. Shutters 122 may be climate controlled and motorized as desired and be responsive to climactic and environmental conditions within the greenhouse. These shutters may be operated at regular intervals during the time when the heater/blower assemblies are being utilized in order to introduce a fresh supply of air into the greenhouse regularly to further enhance the growing process therewithin.

Figure 8:
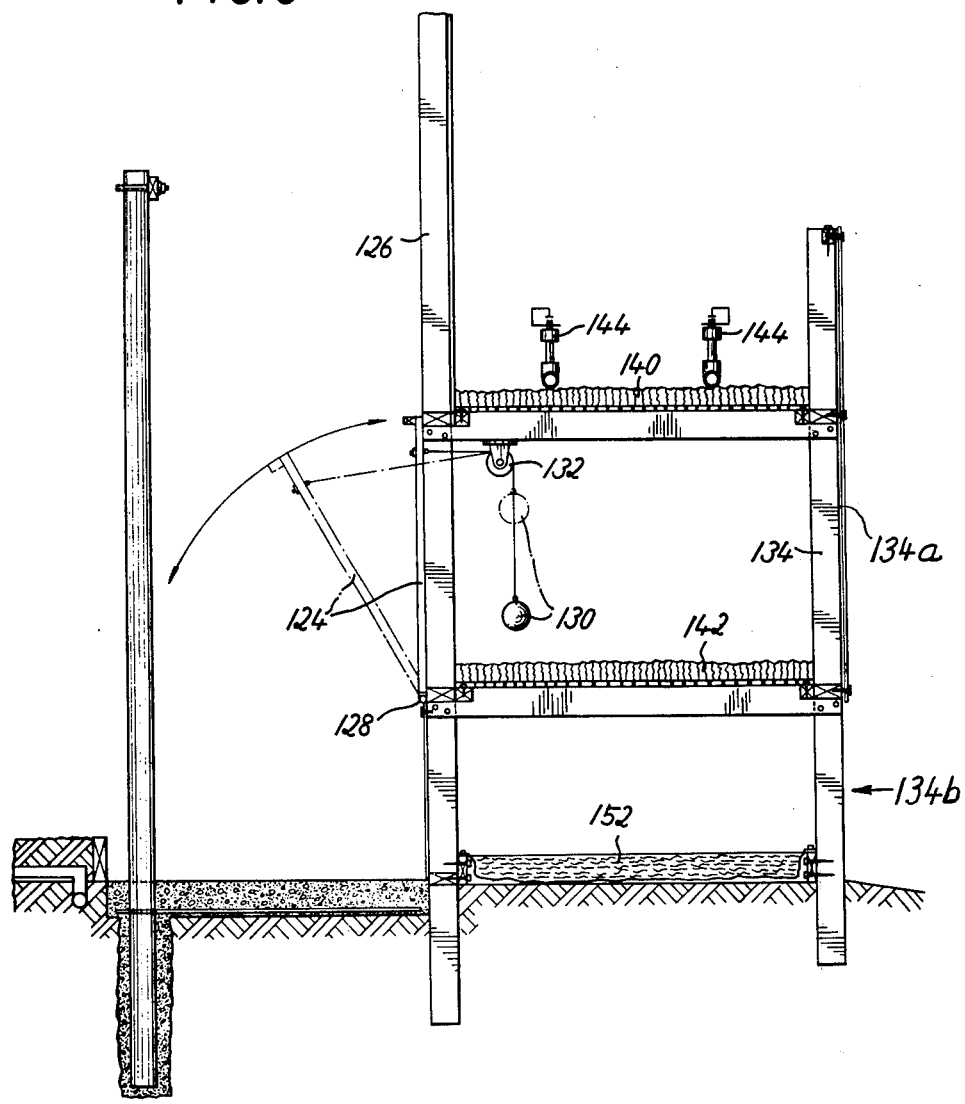
FIG. 8 is a partial sectional view of the rear portion of the greenhouse in conjunction with the cooling system attached on the outside thereof.

Further reference to FIG. 2 illustrates exhaust fans 72 and 74 being utilized, in conjunction with a baffle system employed at the rear of the greenhouse as indicated in FIG. 1 by numeral 124 and shown in FIG. 8 in more detail. Referring now to FIG. 8, there is shown the rear wall 126 of the greenhouse having the baffle 124 hingedly connected thereto as at 128, the opening of the baffle being controlled by a counterweight system 130 movable over a pulley 132. The amount of opening of the baffle 124 is controlled by the internal pressure within the greenhouse, as will be explained hereinafter. The cooling system is connected to the outer wall of the greenhouse and this will be discussed in more detail hereinafter. At this point, the discussion will proceed with regard to the cooperation between the exhaust fans 72 and 74 and baffle 124. During normal conditions, when heating is not required, fresh air is drawn into the greenhouse by means of controlling the exhaust fans 72 and 74 to operate, thereby causing the baffle 124 to open allowing fresh air to pass from without the greenhouse through the rear wall thereof and into the greenhouse. Placing the baffle in the direction indicated enables the fresh air being brought in to be directed towards the roof of the greenhouse and away from the growing plants. In this manner, periodically fresh air can be brought within the greenhouse by time-controlling the operation of the exhaust fans 72 and 74.

Figure 6:
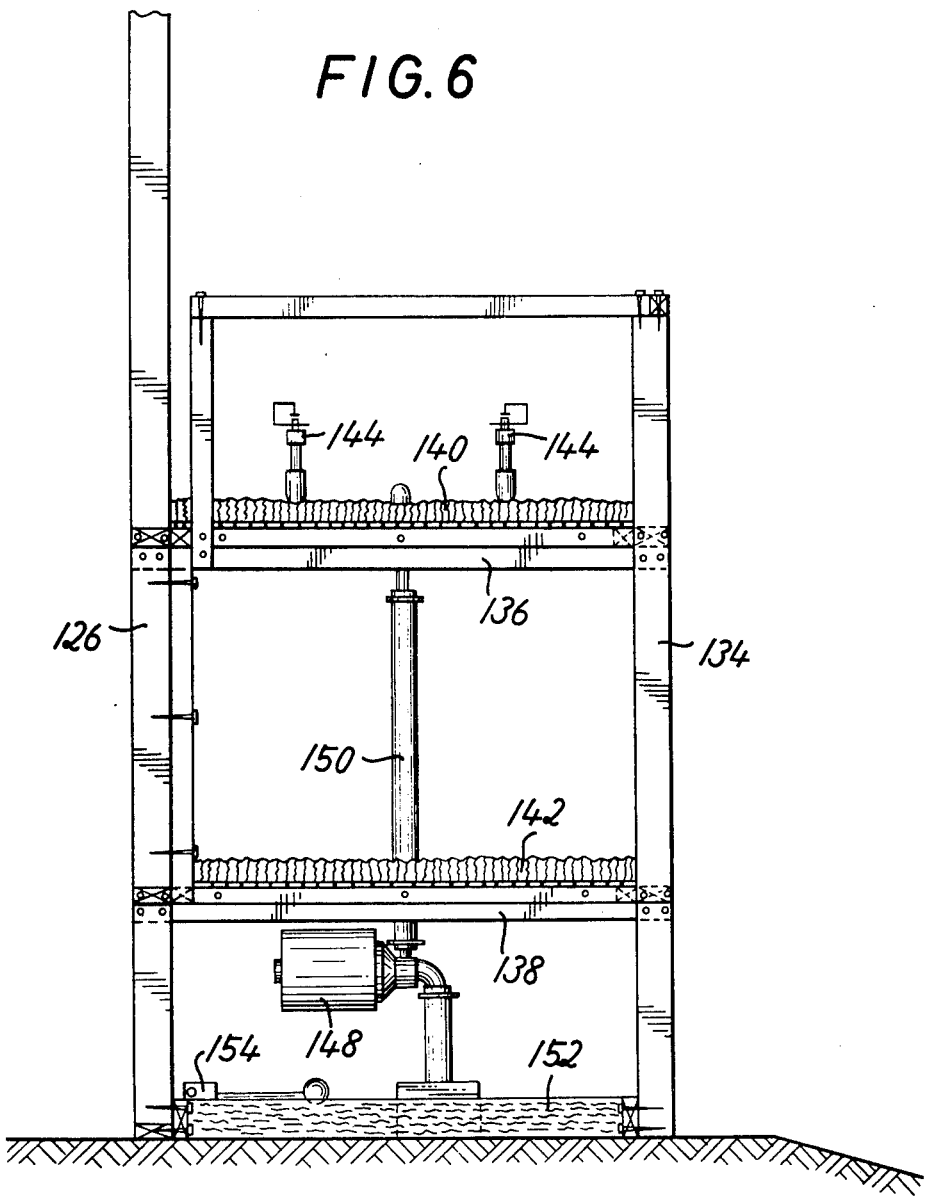
FIG. 6 is a side elevational view of the cooling system located outside the rear wall of the greenhouse.
Figure 7:
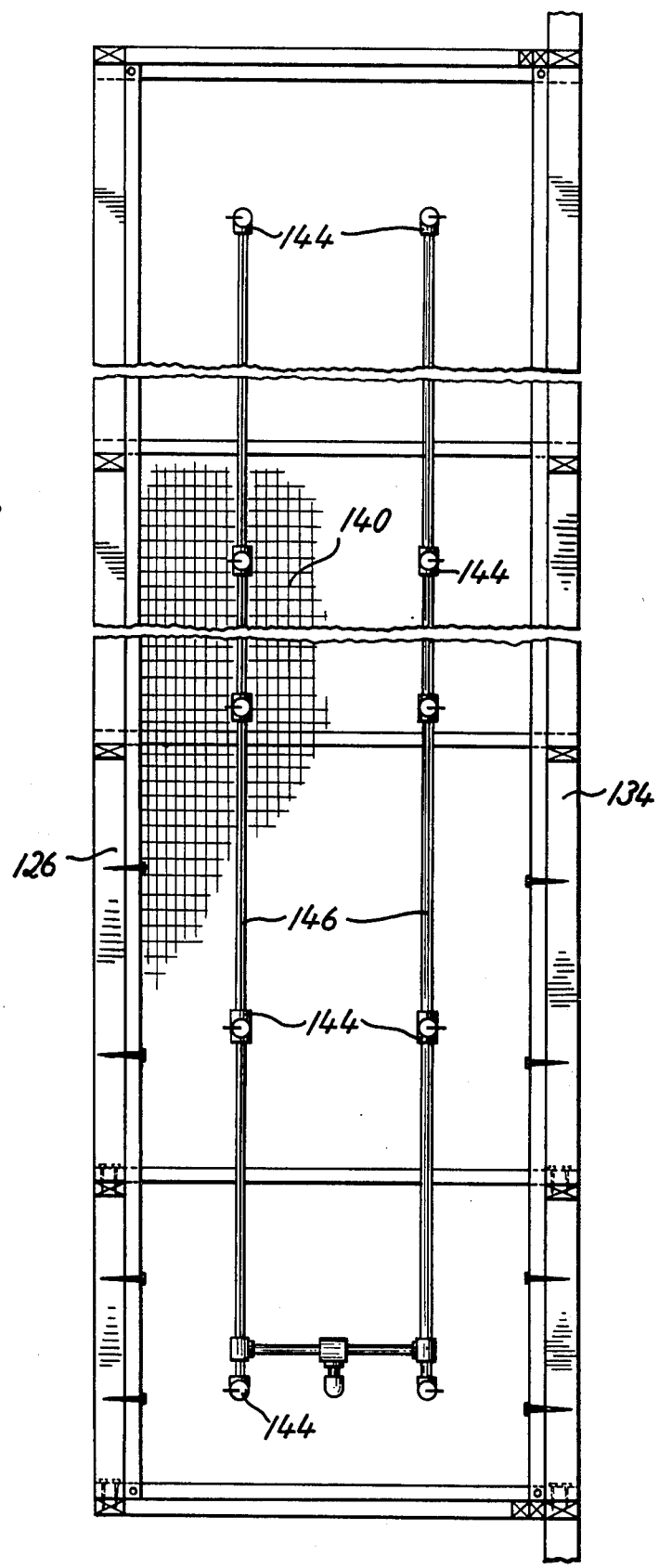
FIG. 7 is a top view of the cooling system of FIG. 6.

Referring now to FIGS. 6 through 8, there is shown the novel cooling system in accordance with the principles of this invention. The cooling system is attached to the rear wall of the greenhouse and comprises a vertical support 134 extending across the rear of the greenhouse to which there is attached horizontally extending vertically spaced support bars 136 and 138, the support bars connected between the support 134 and the rear wall 126 of the greenhouse. Water pads 140 and 142 are supported on support bars 136 and 138, respectively, the water pads generally being formed of Aspen fibers.

Adiabatic cooling principles are employed with the present invention in that fresh air passes through a fine mist or spray causing evaporation, the cooled air then passing through the water pads 140 and 142 and being drawn within the house through rear baffle system 124. Thus, when the exhaust fans 72 and 74 are engaged and operating in the front of the greenhouse and desired cooling is to be employed, the adiabatic cooling system illustrated in FIGS. 6 through 8 is operative. In order to achieve the desired mist, a plurality of misting heads 144 are connected to a water supply pipe 146, the misting heads being connected above the upper water pad 140. The water supply pipe 146 is connected to a pump 148 through a pipe or hose 150. The water pump 148 is also connected to a water return tray 152 in which water is continuously recirculated within the cooling system, that water being drawn from the tray the pump 148 through the hose 150 and directed to the misting heads 144. The misting heads are spaced with regard to each other to cover the area of the upper water pad 140 in order to enhance the misting and adiabatic cooling effect of this invention. A float valve 154 is employed to control the water level within the water return tray 152.

In operation, a fine mist is produced by the misting heads 144, the fine mist generally covering the area above the water pad 140. When air is drawn through the mist area above the water pad 140 and through the water pad, it is cooled. Additionally, air is drawn through the water pad 142 in an upwardly direction, this air also being cooled as it passes through the water pad. To effect the above-described flow, the upper portion of support 134 (FIG. 8) is covered by a sheet 134a while the bottom portion 134b is open, thus permitting air to flow downwardly through water pad 140 and upwardly through water pad 142, respectively. This cool air then enters the greenhouse through the baffle vent in accordance with the amount of internal pressure caused by the exhaust fans 72 and 74 operating at the front of the greenhouse. Of note is the provision of horizontal pads which materially improves the surface through which the air passes, that surface not being affected by the general disadvantages previously found where water pads were employed in a vertical position against the rear wall of a greenhouse. The clogging effect generally found in the past as well as other problems attendant with a prior art cooling pads have been obviated with the present invention. Additionally, the adiabatic cooling effect by passing air over the fine misting spray further enhances the cooling, and with use of the water pump, the amount of water employed in this system is easily controlled. Thus, there is provided a generally economically feasible cooling system employing vertical pads and a fine mist spray for achieving a cooling effect in which there is a limited amount of water used in the system.

The above blower/furnace convection forced air system as well as the cooling system and fresh air system employing exhausts 72 and 74 are integrally related for controlling the environment within the greenhouse. During normal weather, when neither cooling nor heating is required, the exhaust fans 72 and 74 are periodically energized to draw fresh air within the greenhouse through the rear baffle vent 124. This is controlled by a suitable electrical timer connected at electrical panel 78.

When it is desired to cool the summer temperatures within the greenhouse, a suitable thermostat located on electrical panel 78 is activated to energize the rear cooling system causing water to be recirculated therethrough enabling the pads to be wetted with a fine mist to be formed above upper pad 140 and to simultaneously energize exhaust fans 72 and 74. During hot temperature high humidity conditions, it is important that the humidity within the greenhouse be maintained below 85%, as discussed above. At this time, the motorized shutter 76 opens bringing outside air into the greenhouse where it mixes with the inside air. Simultaneously the heater is turned on, through the use of an interlock relay, not shown, and the mixed air is heated and distributed throughout the greenhouse by use of the convection distribution tube system. The interlock relay ensures that the exhaust fan does not operate simultaneously with the heater/blower assembly. Under normal conditions, a thermostat would cause the exhaust fan and cooling system to operate because of the temperature within the greenhouse. In order to reduce the humidity, the heater and blower system is employed with the convection tubes so as to decrease the humidity by heating the air within the greenhouse. When the desired humidity level is achieved, the exhaust fan and cooling system is thereafter employed to reduce the temperature conditions within the greenhouse. Thus, the interlock relay prevents the simultaneous operation, under high humidity conditions, of both the cooling system employing the rear cooler and exhaust fan and the heater/blower convection tube system.

It should be noted that employing the plurality of convection tubes for distribution of the forced air, whether heated or not is more evenly distributed throughout the greenhouse. Such a distribution system enhances the environmental control within the greenhouse to assist in the growing processes carried on therein.

It should also be noted that periodic infusions of fresh air within the greenhouse enables enough carbon dioxide to be supplied to allow the photosynthesis process to be carried on properly. Without the periodic infusion of such fresh air, the photosynthesis processes would be hampered.

Provision of the heater assemblies at ground level also represents an improvement over the prior art in that the heated air normally rises toward the distribution box. In prior art greenhouses, a heater assembly is located at the location of the distribution box, thus requiring that cool air be drawn upwardly before being heated and distributed throughout the greenhouse. Such a construction is inefficient, and the present invention provides significant improvements thereover.

As a further feature of the placement of the blower assembly at the floor level within the greenhouse, and its being supported slightly above the floor thereof, improvement with regard to insect and disease control can be achieved. Thermal insecticides and fungicides can be employed by placing them under the blower which draws the fumes thereof and evenly distributes them through the greenhouse by means of the convection air tubing. Fulex is one insecticide which can be used while Exotherm Termil is a fungicide suitable for such use. As can be readily appreciated, the use of the forced blower system will enable easy and rapid application of the fungicides and insecticides as desired. This represents yet a further improvement of the invention and results from raising the blower slightly above ground level within the greenhouse to enable the vaporized media to be easily distributed.

Referring now to FIGS. 15 and 16, there is shown another feature of this invention in which means are provided for correcting overwatering within the troughs. An elongated pipe member 156 is placed in the bottom of the trough and a slope is provided from front to back for the pipe. The tube or pipe 156 is provided with a plurality of slits 158 in the bottom portion thereof, and when the trough is overwatered, water will flow into the tubes through these slits 158 to be drained out of the rear portion of the greenhouse. Additionally, this pipe or tube 156 can serve to flush dissolved salts which buildup within the troughs. In this case, the troughs are overwatered so as to cause the desired flushing effect to be achieved, with the salts being drained into the water pipe 156 through the slits 158 to be carried out of the greenhouse accordingly.

Referring to FIG. 17, there is yet another feature of the present invention illustrated. A collection bottle 160 is employed which is connected at the end of each planting bed by means of a leader 162 to the trough. The collection bottle has gradations 164 thereon, these gradations indicating the amount of liquid or moisture levels within the respective trough beds. Thus, the feedwater verification system illustrated in FIG. 17 is yet another effective environmental control system of the present invention.

While this invention has been shown and described in certain particular arrangements for illustration and explanation, it will be understood that the structures and illustrations included in this application may be applied to other and widely used types of greenhouses without departing from the spirit and scope of this invention.

What is claimed is:

1. A greenhouse comprising
a front wall assembly
a rear wall assembly
a pair of spaced-apart leveling plates located at the outer edges of the greenhouse forming the width thereof, and an arched roof connecting said front and rear wall assemblies and being connected between said spaced-apart side leveling plates,
said side leveling plates running the length of said greenhouse and being placed on level ground,
a cover placed over said roof and extending between said side leveling plates,
attachment means connecting said covers to each of said side leveling plates, said cover being placed on said roof,
said roof comprising curved members attached together forming rafters and being secured at their outer ends in the ground at regularly spaced distances along the length of said greenhouse and purlins connected to said rafters extending lengthwise in said greenhouse,
exhaust fan means attached to the front wall of said greenhouse,
an opening provided at the rear wall of said greenhouse, said exhaust fan means operating to draw outside air into said greenhouse from said rear wall end,
baffle louver means connected at the rear wall of said greenhouse, said baffle louver means opening responsive to said exhaust fan means being in operation, said baffle louver means directing air upwardly toward the roof of the greenhouse away from plants in troughs on the greenhouse floor.
counterweight means connected to said baffle louver means,
said baffle louver means comprising door means hingedly connected at its lower end to the rear wall of said greenhouse, the top of said door means connected to said counterweight means, said door means swinging open at its upper end responsive to the operation of said exhaust fan means at said front walls of said greenhouse to direct air upwardly as it enters said greenhouse, cooling means located outside the rear wall of said greenhouse, said cooling means cooling air prior to its entry into said greenhouse, said cooling means comprising means for forming a water mist and means for drawing said outside air past said water mist for adiabatically cooling said air, said cooling means comprising water pads, means for supporting said water pads in a horizontal position, means for wetting said water pads, and means for drawing said outside air through said water pads prior to entry into said greenhouse for cooling said air, said means for wetting said water pads comprising misting means for creating a mist, said mist being deposited on said water pads, said outside air being drawn past said mist and through said water pads for achieving the cooling of said air prior to its entry into the greenhouse, said cooling means comprising separated upper and lower water pads, said water pads being horizontally supported with outside air passing therethrough prior to entry into said greenhouse.

2. A greenhouse as set forth in claim 1, wherein said rafters and said purlins comprise tubular members.

3. A greenhouse as set forth in claim 1, wherein each of said leveling plates comprises a 2 inch × 4 inch member.

4. A greenhouse as set forth in claim 1, wherein said front wall assembly comprises pre-cut sections formed of a tubular section attached to a pre-cut member, said pre-cut members adapted to engage each other for enabling said front wall to be assembled.

5. A greenhouse as set forth in claim 4, wherein said pre-cut member comprises wood.

6. A greenhouse as set forth in claim 5, wherein said wood comprises strips of wood laminated together, said pre-cut sections including curved sections, said laminated strips of wood being bent to conform to the curvature of said curved sections and being attached to respective tubular sections.

7. A greenhouse as set forth in claim 2, wherein each of said curved tubular member has one male swaged end and a female receiver end, said rafter comprising pairs of said curved tubular members attached end to end with said one male swaged end of one tubular member inserted in a female receiver end of a cooperating tubular member, the outer ends of said pair of members being anchored in the ground.

8. A greenhouse as set forth in claim 1, wherein each of said curved tubular members forming said rafters is further provided with a bridge member having female receiver ends, said rafter comprising two curved tubular members and said bridge member connected together with the male swaged ends of said two curved members being inserted in said female receiver ends of said bridge member, said female receiver ends of said curved tubular members being anchored in the ground at opposite sides of said greenhouse.

9. A greenhouse as set forth in claim 1, comprising U-bolt means securing each of said rafters to said side leveling plates, said side leveling plates comprising spaced apart apertures for receiving the legs of said U-bolts, and nuts adapted to be attached to said legs of said U-bolts.

10. A greenhouse as set forth in claim 1, wherein said greenhouse comprises at least one trough extending along the length of the greenhouse, said trough comprising fixed sides and a plastic covering on the bottom thereof, a growing medium placed in said trough, means for supplying water and nutrients to said growing medium, a water collection member placed on the bottom of said trough for collecting excess water not absorbed in said growing medium, and drain means located outside said trough for receiving said excess water.

11. A greenhouse as in claim 1, wherein said water collection member comprises a fixed tubular member extending the length of said trough having slits cut in the bottom portion at spaced intervals, said fixed tubular member having a pitch to enable the excess water collected in said tube through said slits to drain out of said trough.

12. A greenhouse as set forth in claim 11, wherein said slits are spaced at regular intervals.

13. A greenhouse as set forth in claim 1, comprising feed-water verification means connected to said trough to display the amount of water in said growing medium.

14. A greenhouse as set forth in claim 13, wherein said feed-water verification means comprises a collection bottle placed outside the trough on the same level on which said trough is built, and a leader connected between the growing medium and said collection bottle for supplying water in said trough to said collection bottle.

15. A greenhouse as set forth in claim 1, wherein said cooling means comprises water recirculation means, water collection means connected to receive said water mist after said outside air has passed therethrough, said water collection means connected to said water recirculation means, misting heads connected to said water recirculation means for receiving the recirculated water used for forming said mist.

16. A greenhouse as set forth in claim 1, wherein said cooling means comprises water collection means connected below said water pads for catching the water drops from said water pads, pump means connected to said water collection means, pipe means connected to said pump means for carrying water therein, said misting means comprising misting heads connected to said pipe means for receiving the water collected by said water collection means.

17. A greenhouse as set forth in claim 1, comprising heating means for providing heat to the inside of said greenhouse, humidistat means for sensing the humidity level in said greenhouse, relay interlock means connected to said humidistat to said heating means and said cooling and said exhaust fan means, said relay interlock means operating said heater means responsive to the humidity level in said greenhouse and simultaneously preventing operation of said exhaust fan means.

* * * * *

UNITED STATES PATENT AND TRADEMARK OFFICE
CERTIFICATE OF CORRECTION

PATENT NO. : 4,047,328
DATED : September 13, 1977
INVENTOR(S) : Donald K. Kehl and Eugene A. Crist It is certified that error appears in the above–identified patent and that said Letters Patent are hereby corrected as shown below:

Column 2, line 49, "o" should read --of--.

Column 3, line 15, "as" should read --at--.

Column 4, line 51, "ther" should read --there--.

Column 4, line 56, delete "of" (second occurrence).

Column 14, Claim 11, line 1, "claim 1" should read --claim 10--.

Signed and Sealed this

Thirteenth Day of June 1978

[SEAL]

Attest:

RUTH C. MASON
*Attesting Officer*

DONALD W. BANNER
*Commissioner of Patents and Trademarks*